United States Patent [19]
Ulbrich et al.

[11] Patent Number: 6,080,074
[45] Date of Patent: Jun. 27, 2000

[54] PROCESS FOR PRECISE ADJUSTMENT OF A HYDROSTATIC AND MECHANICAL TORQUE DIVISION GEARING

[75] Inventors: Peter Ulbrich, Behamberg; Gerhard Josef Frühwirth, Schönau; Josef Nöstaller, Oswald, all of Austria

[73] Assignee: Steyr-Daimler-Puch Aktiengesellschaft, Vienna, Australia

[21] Appl. No.: 09/180,080

[22] PCT Filed: Apr. 29, 1997

[86] PCT No.: PCT/AT97/00083

§ 371 Date: Oct. 29, 1998

§ 102(e) Date: Oct. 29, 1998

[87] PCT Pub. No.: WO97/41371

PCT Pub. Date: Nov. 6, 1997

[30] Foreign Application Priority Data

Apr. 30, 1996 [AT] Austria ................................. 777/96

[51] Int. Cl.[7] ........................... F16H 47/04; F16H 59/46; F16H 61/20
[52] U.S. Cl. .................. 475/76; 475/72; 477/68; 60/448; 60/449; 74/731.1; 74/732.1
[58] Field of Search ................ 475/72–74, 78, 475/76, 80; 477/52, 68, 69; 60/448, 449, 487; 74/731.1, 732.1

[56] References Cited

U.S. PATENT DOCUMENTS

| | | |
|---|---|---|
| 4,344,499 | 8/1982 | van der Lely et al. . |
| 4,368,798 | 1/1983 | Meyerle et al. . |
| 4,465,142 | 8/1984 | van der Lely et al. . |
| 5,159,855 | 11/1992 | Nikolaus et al. . |
| 5,328,418 | 7/1994 | Meyerle ........................................ 475/81 |
| 5,343,779 | 9/1994 | Nikolaus et al. . |
| 5,406,793 | 4/1995 | Maruyama et al. . |
| 5,531,304 | 7/1996 | Ishino et al. .......................... 475/78 X |
| 5,553,453 | 9/1996 | Coutant et al. ............................ 60/448 |
| 5,890,982 | 4/1999 | Meyerle ................................ 475/81 X |
| 5,931,758 | 8/1999 | Walter ...................................... 475/72 |
| 5,980,411 | 11/1999 | Wontner ................................... 475/76 |
| 6,001,038 | 12/1999 | Wontner et al. ...................... 475/72 X |

Primary Examiner—Charles A Marmor
Assistant Examiner—Ankur Parekh
Attorney, Agent, or Firm—Bachman & LaPointe, P.C.

[57] ABSTRACT

A hydrostatic/mechanical multiple path power transmission comprises an adjustable hydrostat unit (4), a summing planetary gearbox (10) with two input shafts (6, 8) and at least two output shafts, and a step gearbox (11) connected to the output shafts. In order to adjust low speeds and standstill precisely and rapidly, the following method is specified: rotational speed signals are formed by sensors (50, 51) on the two input shafts (6, 8) of the summing planetary gearbox (10), and are compared with each other by counters (61, 62); the actual pulse count difference formed in this way is compared with a desired pulse count difference, and a controller [sic] and the output signal of a controller (66) that responds to the result of this comparison effects adjustment of the hydrostat (4).

6 Claims, 2 Drawing Sheets

6,080,074

PROCESS FOR PRECISE ADJUSTMENT OF A HYDROSTATIC AND MECHANICAL TORQUE DIVISION GEARING

BACKGROUND OF THE INVENTION

The invention relates to a method for the fine control of a hydrostatic/mechanical multiple path power transmission, which comprises an adjustable hydrostat unit, a summing planetary gearbox with two input shafts—one from the hydrostatic and one from the mechanical path—and at least two output shafts, and a step gearbox connected to the output shafts.

When agricultural tractors or work vehicles are used, it is desired for specific operations—for example for sowing or sweeping—to be able to travel for a relatively long time at a very low and precisely set speed or, in the case of difficult maneuvres—for example when coupling a work machine—to perform very slow movements, with occasional standstill, even on sloping terrain. In the case of the multiple path power transmissions known hitherto, these modes of operation are not possible.

A great problem here resides primarily in the fact that precise speed control needs a precise actual signal. However, such a signal is not available at low speeds. At a standstill, there is no signal available at all, for which reason standstill control is impossible. The signal from an inductive transmitter is too weak and the pulse train is too long, the amplitude of a signal from a Hall transmitter is certainly adequate but the pulse train is also again too slow. This causes agonizingly slow response to the actuation of the throttle lever (desired speed) and to changes in the driving values; in the extreme case, a molehill on the field can lead to stalling of the engine. Precise setting of the crawl speed is not possible.

Transmissions on which the method is based are disclosed, for example, by DE 195 27 754 A1 and U.S. Pat. No. 5,159,855. In the case of these transmissions, the summing planetary gearbox has five shafts. One input shaft is mechanically directly driven, the second via the hydrostat. Of the three output shafts, in each gear one conveys the drive torque into the subsequent step gearbox. Depending on which gear is selected there, the power flow is also different in the summing planetary gearbox, and so also is the transmission ratio in relation to the power flow. U.S. Pat. No. 5,159,885 even discloses that if a coupling shaft is intended to be set to zero rotational speed, this is not guaranteed, for measurement and control reasons, and that the motor vehicle may move unintentionally.

The object of the invention is therefore to provide a method according to which very low speeds, right down to a complete standstill, can be adjusted precisely and rapidly.

SUMMARY OF THE INVENTION

According to the invention, this object is achieved by pulse-like rotational speed signals formed on the two input shafts of the summing planetary gearbox or on parts connected thereto being compared with each other, and the actual pulse count difference formed in this way being compared with a desired pulse count difference corresponding to a desired speed in a controller whose output signal affects adjustment of the hydrostat.

In this case, use is made of a special feature of summing planetary gearboxes of this type. When the vehicle is at a standstill or at a very low speed, the two input shafts rotate at speeds that are sufficient to make them easily measurable, for the most part in the opposite direction. It is possible, even at a complete standstill, for strong and sufficiently rapidly succeeding pulses to be picked up. If the pulses are picked up on preceding gearwheels, rather than on the shafts themselves or on pulse rings with the same pitch, then this has to be taken into account.

Even at the lowest speeds, this permits precise control which responds rapidly to the driver's wish and to changes to the driving resistance, right down to a complete standstill, even on sloping terrain. Thus, owing to the present invention, even standstill control is provided, which was previously not possible.

In a development of the invention, at least one of the pulse-like rotational speed signals is converted, taking account of the transmission ratio acting in the summing planetary gearbox, and only then are the signals compared with each other. As a result, the comparison of the pulse-like rotational speed signals becomes significantly simpler and faster. This additionally benefits from the fact that the fine control is normally needed only in one—the slowest—gear.

This also has the advantage that the pulse-like rotational speed signals converted in this way are identical at a standstill, that is to say their pulse counts are equal, so that for this operating state it is also possible for zero to be predefined as the desired pulse count difference. In this way, precise standstill control can be performed in a manner that is particularly simple in control terms, unimpaired by variable holding forces acting on the vehicle.

In a preferred embodiment, the conversion of the at least one of the pulse-like rotational speed signals, taking account of the transmission ratio acting in the summing planetary gearbox, is carried out by means of pulse-count multipliers. These are elements which are tried and tested both as hardware and as software, which operate or execute very rapidly and are available cheaply. It is merely necessary to input to them the transmission ratio to be taken into account. At the same time, it is also possible to take equal account of where the pulses are picked up.

An improved time behavior, in particular more rapid response, and precise maintenance of the desired traveling speed and of the standstill can be achieved by using a pulse-count multiplier that can be cascaded. This advantage is particularly important if the transmission ratio to be taken into account is a multi-place decimal number, so that in the normal case it is necessary to count very many pulses for the comparison, which, in the case of such transmission ratios, would delay the control to the extent of impossibility. The conversion in successive steps means that, in the first place, only a ratio similar to the first two places of the transmission ratio is adjusted, and then the next place is also taken into account in a further counting pass, and so on. Since, using modern control processors, this calculation proceeds more rapidly in any case than the controller which is adjusting the hydrostat can follow, this means the maximum adjustment speed and the highest accuracy when setting the desired speed.

Furthermore, it is within the scope of the invention to engage the fine control by means of a selector device, and to transmit the signal supplied by the throttle lever (gas pedal) to the control unit in accordance with a different function. In other words, the gas-pedal travel assigned to the low speed range is spread out, so that precise setting is also possible from the ergonomic point of view.

BRIEF DESCRIPTION OF THE INVENTION

The inventive method is explained below with reference to figures, in which:

FIG. 1 shows a hydrostatic/mechanical multiple path power transmission suitable for carrying out the inventive method, FIG. 2 shows a functional schematic diagram of the inventive method.

DETAILED DESCRIPTION

Figure 1:
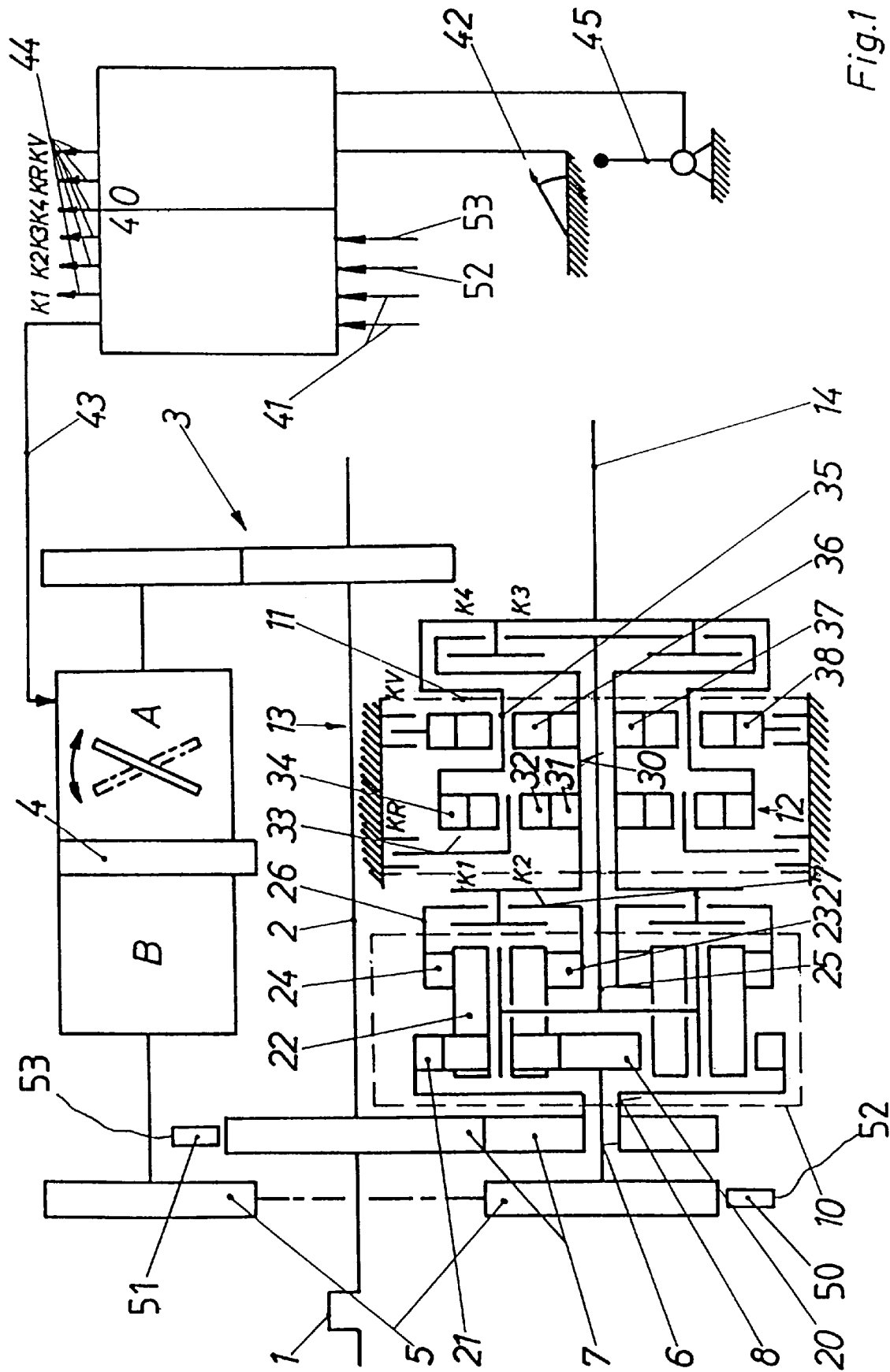

In FIG. 1, the engine 1, for example an internal combustion engine, is only indicated. It drives a transmission input shaft 2 without an interposed clutch. This shaft drives, on the one hand, a controllable hydrostat unit 4 via a first gear-wheel transmission 3, the output of said hydrostat unit driving a first input shaft 6 via a second gear-wheel transmission 5. On the other hand, the transmission input shaft 2 drives a second input shaft 8 via a third gear-wheel transmission 7. The hydrostat unit 4 comprises two hydrostatic machines A, B, of which one always works as a motor and one as a pump. The machine A can be controlled steplessly in both directions of rotation.

The two input shafts 6, 8 are part of a summing planetary gearbox 10, from which, via clutches K1, K2, a step gearbox 11 is driven, which here comprises a first planetary gearbox stage 12 with a clutch KR (more precisely: a brake) and a second planetary gearbox stage 13 with a clutch (more precisely: a brake) KV. An output shaft 14, which serves, for example, to drive a vehicle, is engaged via clutches K3, K4.

The summing planetary gearbox 10 contains a first sun 20, a first internal gear 21 and graduated planets 22, which form the first planetary gear set. The second planetary gear set comprises a second sun 23, an internal gear 24 and the graduated planets 22, which are common to both sets. The planets 22 are mounted on a planet carrier, whose shaft 25 constitutes the first output shaft of the summing planetary gearbox 10. The second internal gear 24 acts on the clutch K1 via an internal-gear shaft 26 and constitutes the second output shaft. The second sun 23 acts on the clutch K2 via a sun shaft 27 and constitutes the third output shaft of the summing planetary gearbox 10.

The first stage 12 of the step gearbox 11 comprises a first sun wheel 31, first planet wheels 32, a first planet carrier 33 and a first annular gear 34. The sun-wheel shaft 30 is driven optionally via one of the two clutches K1, K2, the first planet carrier 33 can be braked firmly by means of the clutch KR on the stationary housing. The first annular gear 34 is connected in a rotationally fixed manner to a second planet carrier 35 of the second planetary gearbox stage 13. Its planet wheels 36 mesh on the inside with a second sun wheel 37, which is connected in a rotationally fixed manner to the sun-wheel shaft 30, and on the outside with a second annular gear 38, which can be braked firmly via the clutch KV on the housing. The output shaft 14 is connected in a rotationally fixed manner to the second planet carrier 35 and, via the clutches K3, K4, can be connected in a rotationally fixed manner either to the planet carrier shaft 25 or to the sun-wheel shaft 30.

Also indicated is a controller 40. Via signal lines 41, said controller obtains measured operating and traveling parameters and a load or speed predefinition from a gas pedal 42. From these signals, the controller 40 forms control signals for the hydrostat 4, which are transmitted to the latter via the control line 43, and control signals 44 for the clutches K1, K2, K3, K4, KR, KV. Finally, a selector switch 45 is also provided, which the driver actuates in order to choose between forward and reverse travel and between normal control and fine control.

For control purposes, various sensors are fitted in the transmission; thus a first sensor 50 for the rotational speed of the first input shaft 6 and a second sensor 51 for the rotational speed of the second input shaft 8. For this purpose, the sensor 50 senses a gearwheel of the second gear-wheel transmission 5, and the sensor 51 senses a gearwheel of the third gear-wheel transmission 7. It does not matter on which of the two gearwheels, since the number of teeth can be taken into account during the subsequent comparison of the pulse counts. These sensors are connected to the controller 40 via lines 52, 53.

Figure 2:
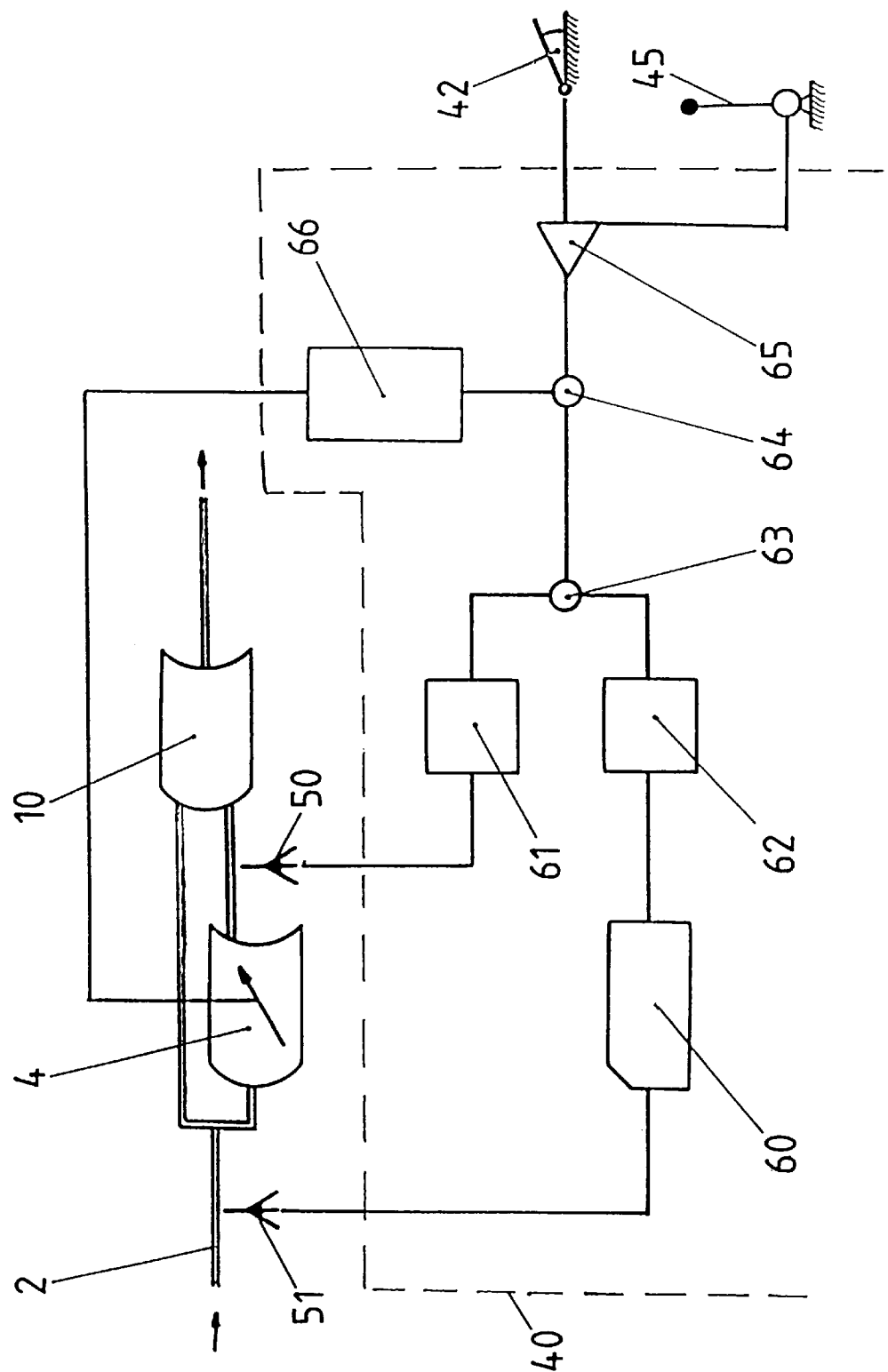

The further path of these sensor signals can be followed in FIG. 2. Since the transmission ratio acting in the summing planetary gearbox has to be taken into account during the comparison of the pulse counts, first of all a signal converter 60 is provided; this is followed by first pulse counters 61, 62. The signal converter 60 may be arranged either between sensor 50 and counter 61 or between sensor 51 and counter 62, or between both. In the present example, the latter is the case.

The signal converter 60 is a pulse-count multiplier, also called a "bit-rate multiplier", and, for example, is in specialist shops under the designation CD4527. With its aid, the transmission ratio is taken into account in such a way that the counters 61, 62 count an equal number of pulses in an equal time when the vehicle is at a standstill. Said signal converter can be cascaded, so that the conversion is carried out in successive steps, as is still be to be explained.

The counting results are then compared with each other, with an appropriate sign, in an adder element 63. For a standstill, they must be equal in a preferred embodiment. In a further adder element 64, this actual pulse count difference is compared with a desired pulse count difference, and a control variable for a controller 66 is formed. The desired pulse count difference, corresponding to a desired traveling speed of the vehicle, is predefined by the driver by means of the gas pedal 42, just as when operating with normal control. However, the fine control is selected by means of the lever 45. In addition to the normal control actions, this has the effect that the signal supplied by the throttle lever 42 is transmitted to the control unit 40 in accordance with a different function via a converter 65. The other function comprises spreading out the desired value assigned to the low speed range over the entire gas-pedal travel, that is to say comprises spreading. As a result, the entire gas-pedal travel corresponds to a speed range from standstill to about 3 km/h.

The conversion in successive steps is carried out thus: the result from the number of teeth of the sensed gearwheels and the transmission ratio predefined in the summing planetary gearbox is, for example, a ratio to be taken into account of 1:1.023. In order to achieve this, it would be necessary for 1000 pulses on the one hand and 1023 pulses on the other hand to be output in the same time. As a result of the cascading, in a first pass only 50 pulses are compared with 51, which corresponds to a transmission ratio of 1:1.02, and then, in a second pass, 333 pulses are compared with 334, which corresponds to the residual error of 1:0.003, and so on as necessary. Since a comparison result and hence a control variable is present as early as after the first pass—that is to say after a very short time—the controller is already able to respond after the first pass. Before said controller has responded and reacted, it is most often also the case that the results of the further passes are available. Otherwise, it only needs to correct further after the further passes. The output signal from the controller 66, the actuating variable, then acts in a suitable way on the hydrostat 4.

What is claimed is:

1. A method for the fine control of a hydrostatic/mechanical multiple path power transmission, which comprises providing a hydrostatic/mechanical multiple path power transmission comprising an adjustable hydrostat unit (4), a summing planetary gearbox (10) with two input shafts (6, 8), one from the hydrostatic and one from the mechanical path, and at least two output shafts, and a step gearbox (11) connected to the output shafts, and obtaining pulse-like rotational speed signals formed by sensors (50, 51) associated with the two input shafts (6, 8) of the summing planetary gearbox (10) and comparing the actual pulse count difference formed in this way with a desired pulse count difference corresponding to a desired speed to obtain an output signal of a controller (66) that corresponds to the result of this comparison and effects adjustment of the hydrostat.

2. The method as claimed in claim 1 and further comprising converting at least one of the pulse-like rotational speed signals in a signal converter (60), to take account of the transmission ratio acting in the summing planetary gearbox (10) before comparing said actual pulse count difference with said desired pulse count difference.

3. The method as claimed in claim 2 and further comprising: setting said desired pulse count difference that is compared with the actual pulse count difference equal to zero for standstill control.

4. The method as claimed in claim 2, wherein the signal converter (60) for the at least one of the pulse-like rotational speed signal taking account of the transmission ratio acting in the summing planetary gearbox is a pulse-count multiplier.

5. The method as claimed in claim 4 and further comprising: cascading the pulse-count multiplier (60) so that the conversion is carried out in successive steps.

6. The method as claimed in claim 1 and further comprising: engaging a fine control is engaged by means of a selector device (45); and transmitting a signal from a throttle lever to the control unit (40) in accordance with a different function via a converter 65 when said fine control is engage.

* * * * *